United States Patent
Lei et al.

(10) Patent No.: US 10,242,211 B2
(45) Date of Patent: Mar. 26, 2019

(54) METHOD AND DEVICE FOR INFORMATION SECURITY MANAGEMENT AND STORAGE MEDIUM

(71) Applicant: TENCENT TECHNOLOGY (SHENZHEN) COMPANY LIMITED, Shenzhen (Guangdong) (CN)

(72) Inventors: Yu Lei, Shenzhen (CN); Jing He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 488 days.

(21) Appl. No.: 14/328,436

(22) Filed: Jul. 10, 2014

(65) Prior Publication Data

US 2014/0324912 A1    Oct. 30, 2014

Related U.S. Application Data

(63) Continuation of application No. PCT/CN2013/090665, filed on Dec. 27, 2013.

(30) Foreign Application Priority Data

Mar. 7, 2013    (CN) .......................... 2013 1 0073568

(51) Int. Cl.
*G06F 17/30* (2006.01)
*G06F 21/62* (2013.01)
(Continued)

(52) U.S. Cl.
CPC .... *G06F 21/6218* (2013.01); *G06F 17/30867* (2013.01); *H04M 1/673* (2013.01); *H04M 1/72519* (2013.01); *H04M 1/72577* (2013.01)

(58) Field of Classification Search
CPC ............... G06F 17/30867; G06F 21/31; G06F 21/6218; G06F 21/62
See application file for complete search history.

(56) References Cited

U.S. PATENT DOCUMENTS 7,620,407 B1 * 11/2009 Donald ................... H04L 51/38
455/466
7,945,633 B2 * 5/2011 Goldman ................ H04L 51/12
709/206

(Continued)

FOREIGN PATENT DOCUMENTS

CN    101515968 A    8/2009
CN    101651745 A    2/2010
(Continued)

OTHER PUBLICATIONS

P. Krzyzanowski, "Lectures in Distributed Systems—Cryptographic Communication and Authentication", 2009, Rutgers University—CS 417: Distributed Systems, retrieved from the Internet Sep. 28, 2016, https://www.cs.rutgers.edu/~pxk/rutgers/notes/content/13-crypto.pdf.*

(Continued)

*Primary Examiner* — Apu M Mofiz
*Assistant Examiner* — Sheryl L Holland
(74) *Attorney, Agent, or Firm* — Oblon, McClelland, Maier & Neustadt, L.L.P.

(57) ABSTRACT

The invention discloses a method and a device for information security management, and a storage medium, in the field of information security technologies. The method comprises: detecting an information input operation of a terminal; obtaining key information corresponding to a triggering operation of a first key, when the triggering operation of the first key is detected; determining whether the obtained key information matches preset key information, and if so, outputting information related to private information stored (Continued)

in a private information database, which corresponds to the preset key information, wherein, the preset key information includes an access password for the private information database and second key information. In the invention, a user needs not access a private space to check private information; instead, the user only needs to input the preset key information to query the information related to the private information. Therefore, the security of the private information is improved.

7 Claims, 3 Drawing Sheets

(51) Int. Cl.
*H04M 1/673* (2006.01)
*H04M 1/725* (2006.01)

(56) References Cited

U.S. PATENT DOCUMENTS

| | | | | |
|---|---|---|---|---|
| 2002/0023215 | A1* | 2/2002 | Wang | G06Q 20/00 713/171 |
| 2005/0038863 | A1* | 2/2005 | Onyon | G06Q 10/107 709/207 |
| 2005/0195956 | A1* | 9/2005 | Kass | H04M 3/42306 379/207.11 |
| 2006/0234686 | A1* | 10/2006 | Grassiotto | H04M 1/72566 455/414.1 |
| 2007/0027953 | A1* | 2/2007 | Wu | G06Q 10/107 709/206 |
| 2007/0266118 | A1* | 11/2007 | Wilkins | G06F 17/30879 709/219 |
| 2007/0271527 | A1* | 11/2007 | Paas | G06F 3/048 715/810 |
| 2008/0200143 | A1* | 8/2008 | Qiu | H04M 1/2535 455/404.2 |
| 2010/0100964 | A1* | 4/2010 | Mahaffey | G06F 21/554 726/25 |
| 2010/0205539 | A1* | 8/2010 | Gestsson | G06Q 10/107 715/752 |
| 2011/0055585 | A1* | 3/2011 | Lee | H04L 9/0844 713/183 |
| 2011/0314111 | A1* | 12/2011 | Wang | G06Q 10/10 709/206 |
| 2012/0032945 | A1* | 2/2012 | Dare | G06F 3/0481 345/418 |
| 2012/0196575 | A1* | 8/2012 | Hymel | H04L 12/587 455/412.2 |
| 2013/0013931 | A1* | 1/2013 | O'Hare | G06F 21/62 713/189 |
| 2013/0128883 | A1* | 5/2013 | Lawson | H04M 1/2473 370/352 |
| 2013/0227030 | A1* | 8/2013 | Eidelson | H04L 67/1095 709/206 |
| 2013/0275530 | A1* | 10/2013 | Matson | H04L 51/24 709/206 |
| 2014/0026025 | A1 | 1/2014 | Smith | |
| 2014/0380173 | A1 | 12/2014 | Zhang | |

FOREIGN PATENT DOCUMENTS

| | | |
|---|---|---|
| CN | 101895609 A | 11/2010 |
| CN | 102006358 A | 4/2011 |
| CN | 102289489 A | 12/2011 |
| CN | 102779137 A | 11/2012 |
| CN | 102968487 A | 3/2013 |

OTHER PUBLICATIONS

Delzanno et al., "Automatic Verification of Time Sensitive Cryptographic Protocols", 2004, Springer-Verlag.*
"NEC Voice Mail and VRS User Guide", 2004, NEC.*
International Search Report issued in PCT/CN2013/090665, dated Apr. 3, 2014, 4 pages.
International Search Report issued in PCT/CN2014/075820, dated Jul. 18, 2014, 4 pages.

* cited by examiner

METHOD AND DEVICE FOR INFORMATION SECURITY MANAGEMENT AND STORAGE MEDIUM

CROSS-REFERENCE TO RELATED APPLICATIONS

This application claims is a continuation application of PCT/CN2013/090665, filed on Dec. 27, 2013, entitled "METHOD AND DEVICE FOR INFORMATION SECURITY MANAGEMENT AND STORAGE MEDIUM", which claims priority to Chinese Application No. 201310073568.1, filed on Mar. 7, 2013, entitled "METHOD AND DEVICE FOR INFORMATION SECURITY MANAGEMENT", the contents of which are incorporated herein by reference in their entirety.

FIELD OF THE INVENTION

The present disclosure relates to the field of information security technologies, and in particular, to a method and a device for information security management and a storage medium.

BACKGROUND OF THE INVENTION

A problem of mobile phone security emerges as the popularization of intelligent mobile phones. The mobile phone security relates to various aspects, one of which refers to the security of a series of private information generated during the communication of a user with others via a mobile phone. For example, a mobile phone user does not expect short messages or call information generated with a certain contact to be seen by others, thus it is necessary to ensure the security of such short messages or call information.

In the prior art, a method for ensuring the security of private information includes introducing a new database into a mobile phone and encrypting the database. When received by the mobile phone, the private information is stored independently in the introduced new database separate from the original storage database of the mobile phone, to ensure the security of the private information. The user may access the introduced new database by inputting an access password to review the private information.

In implementing the present disclosure, the inventors found that there exist at least the following problems in the prior art:

In the prior art, in order to protect private information, the user will not be prompted after the private information is received, and is allowed to access the new database for querying only by inputting an access password, and at this time, the current interface is switched to an interface for the private space in the terminal. Therefore, in a relatively complex environment or an environment in which the private information is likely leaked, it is inconvenient to check whether there is any updated private information that needs to be aware of in time, because if the user frequently accesses and checks the private space even if there exists no update of the private information, vigilance and suspicion from the surrounding environment might be caused, which may likely result in the leakage of the private space directly, as a result, the security of the private information is lowered.

SUMMARY OF THE INVENTION

Therefore, it is an object of the embodiments of the present disclosure to provide a method and a device for information security management, and a storage medium, for the purpose of improving information security.

In one aspect, an embodiment of the present disclosure provides a method for information security management, including:

detecting an information input operation of a terminal;

obtaining key information corresponding to a triggering operation of a first key, when the triggering operation of the first key is detected; and determining whether the key information matches preset key information, and if so, outputting information related to private information stored in a private information database, which corresponds to the preset key information, wherein, the preset key information includes: an access password for the private information database, and second key information.

In another aspect, an embodiment of the present disclosure provides a device for information security management, including at least a processor operating in conjunction with a memory and a plurality of units, wherein the plurality of units include:

a detecting module, which is used for detecting an information input operation of a terminal;

an obtaining module, which is used for obtaining key information corresponding to a triggering operation of a first key, when the triggering operation of the first key is detected; and an outputting module, which is used for determining whether the key information matches a preset key information, and if so, outputting information related to private information stored in a private information database, which corresponds to the preset key information, wherein, the preset key information includes: an access password for the private information database, and second key information.

In yet another aspect, an embodiment of the present disclosure further provides a storage medium containing computer-executable instructions, which, when executed by a computer processor, perform a method for information security management, wherein, the method includes:

detecting an information input operation of a terminal;

obtaining key information corresponding to a triggering operation of a first key, when the triggering operation of the first key is detected; and determining whether the key information matches a preset key information, and if so, outputting information related to private information stored in a private information database, which corresponds to the preset key information, wherein, the preset key information includes: an access password for the private information database, and second key information.

The technical solutions of the embodiments of the present disclosure have the beneficial effects as follows: with the present disclosure, an information input operation of a terminal is detected; the key information corresponding to a triggering operation of a first key is obtained when the triggering operation of the first key is detected; and it is determined whether the key information matches the preset key information, and if so, information related to private information stored in a private information database, which corresponds to the preset key information, is outputted, wherein, the preset key information includes an access password for the private information database and second key information. In the technical solution of the present disclosure, a user need not access the private space to check any new private information; instead, the user only needs to input the preset key information to check the information related to the private information, especially, to check whether there exists any updated private information, so that the security of the private information can be improved.

BRIEF DESCRIPTION OF THE DRAWINGS

In order to more clearly illustrate the technical solutions of the embodiments of the present disclosure, the figures used for the description of the embodiments will be briefly introduced below. Apparently, the figures for the description below illustrate only some embodiments of the present disclosure, and other figures may also be obtained by one of ordinary skills in the art according to the described figures without creative work.

DETAILED DESCRIPTION OF THE EMBODIMENTS

In order to make the objects, the technical solutions and the advantages of the present disclosure more apparent, the embodiments of the present disclosure will be further described in detail below in conjunction with the drawings. Apparently, the described embodiments are only a part instead of all of the embodiments of the present disclosure. These embodiments are intended to illustrate the principles of the present disclosure, rather than limiting the present disclosure to these specific embodiments. All other embodiments obtained by one of ordinary skills in the art in light of the embodiments of the present disclosure without creative work fall within the protection scope of the present disclosure.

In the present embodiments, another private information database, which is different from the original database on a terminal and is adapted to store the private information of a user, is configured in the terminal, and an access password input interface is provided, so that the user can encrypt and manage a specified database, thereby establishing a private space. In the present embodiments, for the sake of convenient operations by a user, the access password for the private information database is preferably composed of numerals, the number of which is not limited. Of course, the access password may also include numerals, alphabet and/or symbols, which is not specifically limited in the embodiments.

The terminals in the present embodiments include: an intelligent mobile phone or other portable devices for communication, which is not specifically limited in the embodiments.

First Embodiment

Figure 1:
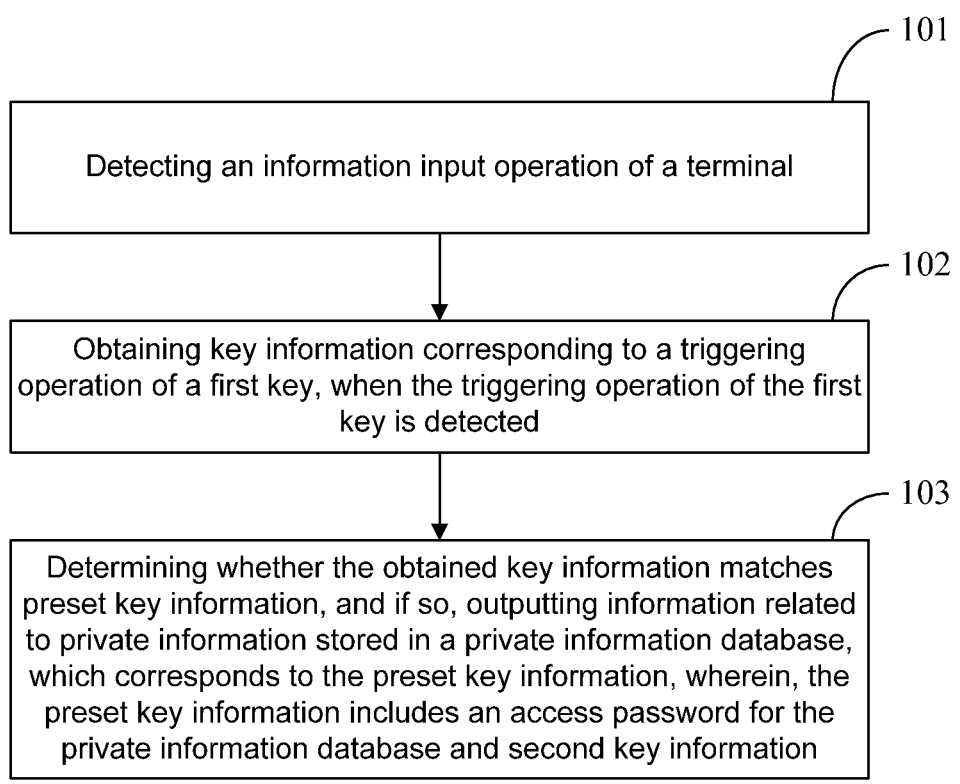
FIG. 1 is a flow chart of a method for information security management according to a first embodiment of the present disclosure.

Referring to FIG. 1, this embodiment provides a method for information security management, and the method may be implemented by an information security management device, which may be realized by software or hardware in a terminal to perform the method. The method includes steps of:

101: detecting an information input operation of a terminal;

102: when a triggering operation on a first key is detected, obtaining key information corresponding to the triggering operation of the first key; and

103: determining whether the key information matches preset key information, and if so, outputting information related to private information, which is stored in a private information database, corresponding to the preset key information, wherein, the preset key information includes: an access password for the private information database, and a second key information.

The beneficial effect of this embodiment is that: with the present disclosure, an information input operation of a terminal is detected; the key information corresponding to a triggering operation of a first key is obtained when the triggering operation of the first key is detected; and it is determined whether the key information matches the preset key information, and if so, information related to private information stored in a private information database, which corresponds to the preset key information, is outputted, wherein, the preset key information includes an access password for the private information database and second key information. In the technical solution of this embodiment, a user needs not access the private space to check any new private information; instead, the user only needs to input the preset key information to check the information related to the private information, especially, to check whether there exists any updated private information, so that the security of the private information can be improved.

Second Embodiment

The present embodiment of the present disclosure provides a method for information security management. In this embodiment, an operation entry is provided to a user, so that the user is enabled to set the preset key information via the operation entry, and check information related to private information by inputting the preset key information and triggering a first key on the terminal.

Herein, the information related to private information includes, but is not limited to any one of or a combination of at least two of: the number of updated private information, a state of private information, an abstract of private information, and the contents of private information. The preset key information may include: an access password for the private information database and second key information. The second key information is used for indicating the type corresponding to the outputted information related to the private information or the receiving time of the outputted information related to the private information. That is, the second key information is used for indicating to output the information related to the private information of the corresponding type, or to output the information related to the private information within the receiving time. For example, a combination of the access password and a symbol # is used to indicate to check whether there exists new information in the private space; a combination of the access password and a symbol * is used to indicate to check whether a new incoming call exists in the private space; a combination of the access password and symbols 30 is used to indicate to check all private information received within 30 minutes; and a combination of the access password and symbols # and 30 is used to indicate to check short messages received within 30 minutes, in this case, the symbols *, # and 30 form the second key information.

Figure 2:
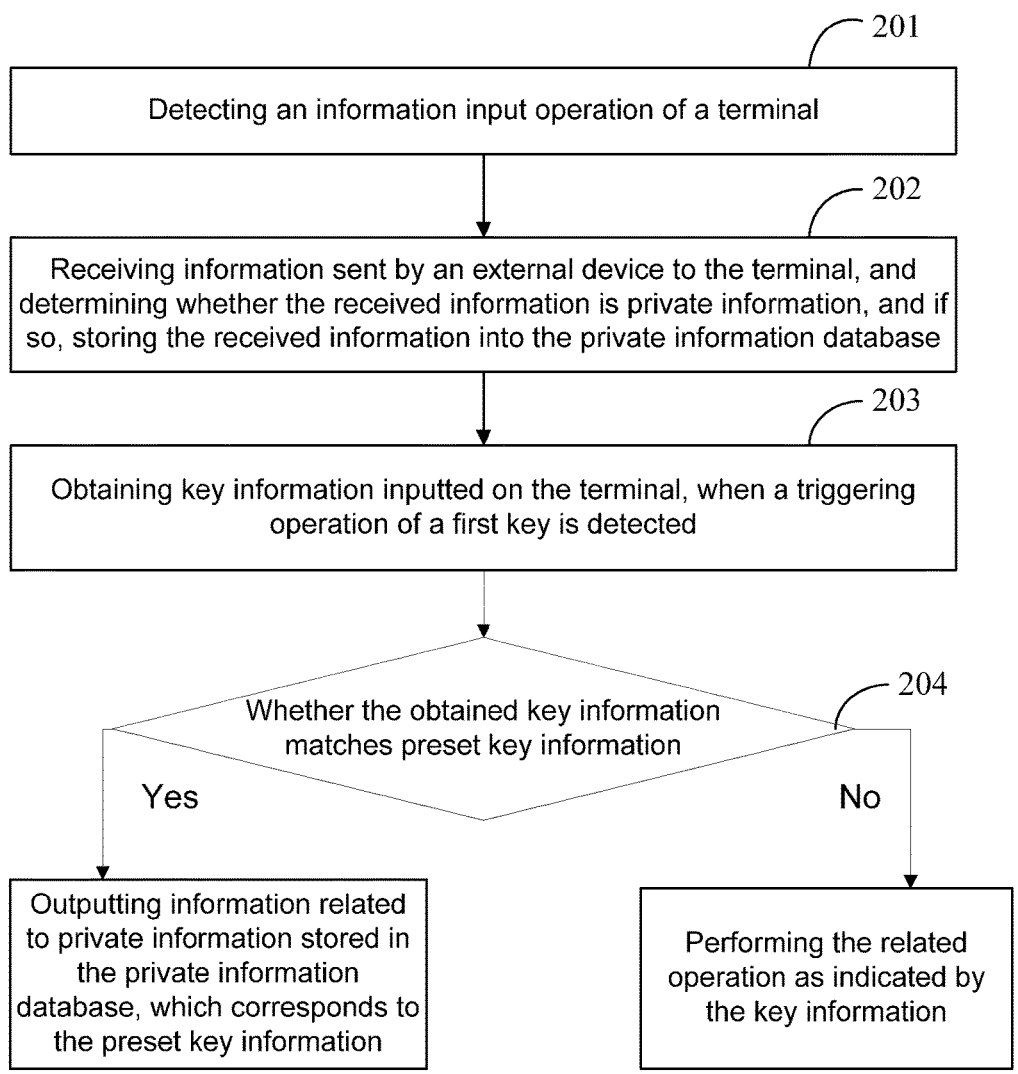
FIG. 2 is a flow chart of a method for information security management according to a second embodiment of the present disclosure.

Referring to FIG. 2, the flow of the method according to this embodiment includes steps 201-206 below.

201: detecting an information input operation of a terminal.

202: receiving information sent by an external device to the terminal, and determining whether the received information is private information, and if so, storing the received information into a private information database; otherwise, processing the received information according to a conventional flow.

In this step 202, the external device includes, but is not limited to: an intelligent terminal such as a mobile phone, a desktop computer and a portable computer. The information sent by the external device includes, but is not limited to: mail information, short message information or call information, which is not specifically limited in this embodiment.

In this embodiment, the private information refers to information that a user wishes to protect. A terminal receives information sent by another terminal, and determines whether the received information is private information. Herein, the specific determination includes: obtaining sender information corresponding to the received information (i.e. information of a sender sending the received information) by parsing the received information; comparing the sender information with contacts in the private information database; and determining the received information as private information if a contact that matches the sender information is present in the private information database.

In this embodiment, after it is determined that the received information is private information, the received information is stored independently into the private information database for protection. If the received information is not private information, the received information is stored into the original database, which is similar to the prior art.

It should be noted that this step is optional, and the terminal may not receive any information sent by other terminals, which is not specifically limited in this embodiment.

203: obtaining key information inputted on the terminal, when a triggering operation of a first key is detected.

In this embodiment, by detecting the first key, it is determined whether the operation on the terminal is an operation to check whether there exists any updated private information. Preferably, the first key is a dial key, or any other key from the keypad, for example, a hangup key, *, #, etc., which is not specifically limited in the present embodiments.

In this step 203, when a triggering operation of the first key is detected, it is determined whether the triggering operation is an operation to query private information. Here, obtaining the key information corresponding to the triggering operation of the first key includes: identifying a key operation in a preset time period before the triggering operation of the first key, and obtaining key information corresponding to the identified key operation. For example, before pressing the dial key, the user may trigger another key operation, thus the key information corresponding to said another key operation is obtained. In general, key operations on the terminal, which may be triggered continuously or discontinuously, are multifunctional. To identify the key operations that are triggered for querying private information, the triggering operation of the first key is used as the ending mark, that is, the key operations triggered within the preset time period and ended with the triggering operation of the first key are identified as the key information corresponding to the triggering operation of the first key, to ensure the validity of the input operations by the user.

In this embodiment, after the triggering operation of the first key is detected on the terminal, key operations within the preset time period before the triggering operation of the first key are obtained, to guarantee the validity of the input operations by the user. Herein, the preset time period may be 5 seconds, 8 seconds, or 15 seconds, for example, which is not specifically limited in this embodiment.

204: determining whether the obtained key information matches the preset key information, and if so, a step 205 is performed; otherwise, a step 206 is performed.

In this embodiment, many pieces of preset key information, each of which corresponds to a different type of private information, are stored according to user settings, and the information related to the private information is distinguished by second key information. For example, the preset key information may be: a combination of the access password and a symbol # (where the symbol # forms the second key information corresponding to a private short message); a combination of the access password and a symbol * (where the symbol * forms the second key information corresponding to a private incoming call); a combination of the access password and symbols ## (where the symbols ## form the second key information corresponding to a private mail); and a combination of the access password and symbols 30 (where the symbols 30 form the second key information corresponding to all the private information within 30 minutes). The obtained key information is compared with the preset key information, and if there exists preset key information that matches the obtained key information, the input operations by the user are used to query private information; otherwise, related operations are performed as indicated by the obtained key information.

205: outputting information related to private information stored in the private information database, which corresponds to the preset key information.

In this embodiment, after it is determined that there exists preset key information matching the obtained key information, the information related to the private information is outputted as indicated by the second key information. If the obtained key information is composed of the access password and a symbol #, the number of updated private short messages is outputted in the input box of the dial key; if the obtained key information is composed of the access password and symbols "##, the number of updated private mails (for example, 0, 1, 2 or more) is outputted in the input box of the dial key; and if the obtained key information is composed of the access password and symbols 30, all the private information within 30 minutes are outputted in the input box of the dial key.

206: performing the related operation as indicated by the obtained key information, for example, dialing the telephone number as inputted.

In this step, if the obtained key information does not match any of the preset key information, the terminal performs the related operation as indicated by the obtained key information, for example, the terminal dials a number or sends a short message, which will not be described again in this embodiment.

The beneficial effect of this embodiment is that: with the present disclosure, an information input operation of a terminal is detected; the key information corresponding to a triggering operation of a first key is obtained when the triggering operation of the first key is detected; and it is determined whether the obtained key information matches the preset key information, and if so, information related to private information stored in a private information database, which corresponds to the preset key information, is outputted, wherein, the preset key information includes an access password for the private information database and second key information. In the technical solution of this embodiment, a user needs not access the private space to check any new private information; instead, the user only needs to input the preset key information to check the information related to the private information. In the present disclosure, the checking of the private information is implemented using the frequently-used keyboard interface, for example, the dial panel or a short message interface, which is conventional and natural without the significant popup or switching of an interface, except for the popup or change of numbers and/or symbols on the dial keypad. In this case, others can hardly notice the checking of the private information by the user unless they star at the screen of the terminal. As a result, the security of the private information can be improved.

Third Embodiment

Figure 3:
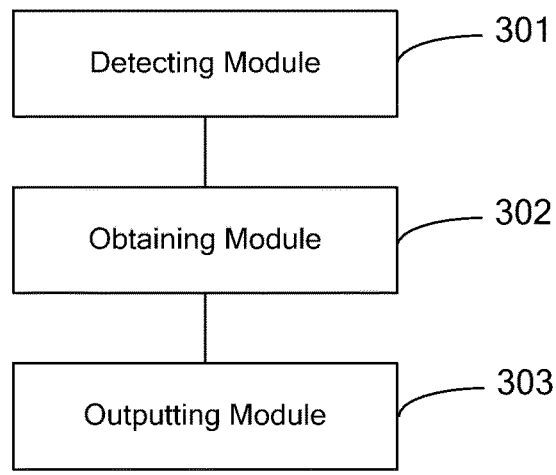
FIG. 3 is a structural representation of a device for information security management according to a third embodiment of the present disclosure.

Referring to FIG. 3, an embodiment of the present disclosure provides a device for information security management, which includes at least a processor operating in conjunction with a memory and a plurality of units, and the plurality of units include: a detecting module 301, an obtaining module 302 and an outputting module 303.

The detecting module 301 is used for detecting an information input operation of a terminal.

The obtaining module 302 is used for obtaining key information corresponding to a triggering operation of a first key when the triggering operation of the first key is detected.

The outputting module 303 is used for determining whether the obtained key information matches a preset key information, and if so, outputting information related to private information stored in a private information database, which corresponds to the preset key information, where, the preset key information includes: an access password for the private information database, and second key information.

Preferably, the obtaining module 302 is specifically used for:
  identifying a key operation within a preset time period before the triggering operation of the first key, and obtaining key information corresponding to the identified key operation.

Figure 4:
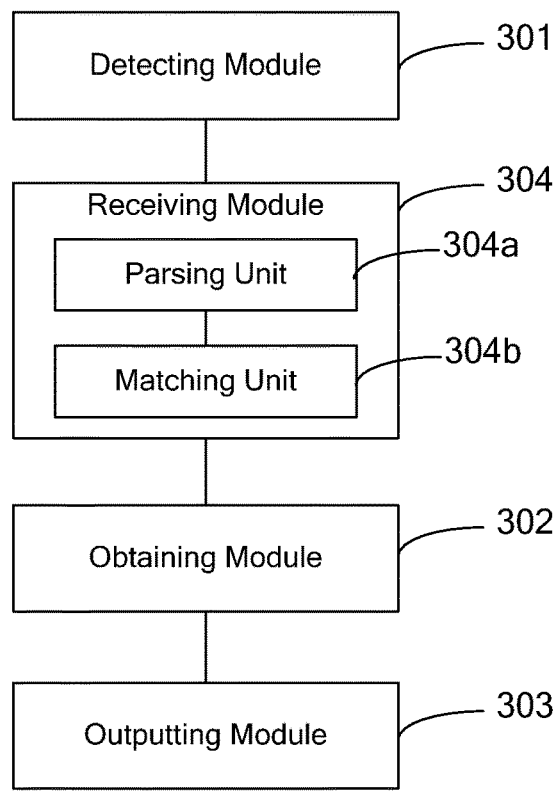
FIG. 4 is a structural representation of a device for information security management according to a fourth embodiment of the present disclosure.

Optionally, referring to FIG. 4, the device further includes:
  a receiving module 304, which is used for receiving information sent by an external device to the terminal before the obtaining module 302 obtains the key information corresponding to the triggering operation of the first key; determining whether the received information is private information, and if so, storing the received information into a private information database.

Referring to FIG. 4, the receiving module may specifically include:
  a parsing unit 304a, which is used for obtaining sender information corresponding to the received information by parsing the received information; and
  a matching unit 304b, which is used for comparing the sender information with the contacts in the private information database, and determining the received information as private information if a contact that matches the sender information is present in the private information database.

Preferably, the first key is a dial key.

Optionally, the second key information is used for indicating the type of the outputted information related to the private information or the receiving time of the outputted information related to the private information.

The information related to the private information may include any one or more of: the number of updated private information, a state of private information, an abstract of private information and contents of private information.

The beneficial effect of this embodiment is that: an information input operation of a terminal is monitored; the key information corresponding to the triggering operation of the first key is obtained, when the triggering operation of the first key is detected; it is determined whether the obtained key information matches the preset key information, and if so, the information related to private information stored in the private information database, which corresponds to the preset key information, is outputted, where the preset key information includes: an access password for the private information database and second key information. In this way, a user needs not access the private space to check whether there is any new private information; instead, the user only needs to input the preset key information to query the information related to the private information, especially, to check whether there exists an update of the private information. As a result, the security of the private information can be improved.

It should be noted that, the device for information security management in the above embodiments is illustrated by taking the illustrative division of the above functional modules. However, in a practical application, the above functions may be allocated to different functional modules as required, that is, the internal structure of the device may be divided into different functional modules to accomplish a part or all of the functions described above.

Additionally, the device for information management in the above embodiment shares the same conception as the above method for information management, and reference may be made to the method embodiment for the implementing process thereof, thus repeated description is omitted herein.

The above sequence numbers of the embodiments of the present disclosure are only for the purpose of description, rather than representing the priority of the embodiments.

An embodiment of the present disclosure further provides a storage medium containing computer-executable instructions, which, when executed by a computer processor, perform a method for information security management, and the method includes:
  detecting an information input operation of a terminal;
  obtaining key information corresponding to a triggering operation of a first key, when the triggering operation of the first key is detected; and
  determining whether the obtained key information matches preset key information, and if so, outputting information related to private information stored in a private information database, which corresponds to the preset key information, where, the preset key information includes an access password for the private information database and second key information.

Specifically, the method for information security management performed by the executable instructions in the storage medium according to the embodiment of the present disclosure may be the method for information security management provided by any embodiment of the present disclosure.

In light of the description of the above embodiments, one skilled in the art may clearly understand that the present disclosure may be implemented by the aid of software and necessary universal hardware; of course, the present disclosure may be implemented by hardware merely. However, in many cases, the former is preferred. Based on such an understanding, the essential part of the technical solutions of the present disclosure, or in other words, the part that contributes to the prior art, may be embodied in the form of a software product stored in a computer-readable storage medium, for example, floppy disk, Read-Only Memory (ROM), Random Access Memory (RAM), FLASH, hard disk, compact disc, etc. of a computer, and includes several instructions that can instruct a computer device (which may be a personal computer, a server, a network device, etc.) to implement the methods according to various embodiments of the present disclosure.

The above description only shows some preferred embodiments of the present disclosure, rather than limiting the scope of the present disclosure. All modifications, equivalent substitutions and improvements made without departing from the spirit and principles of the present disclosure should be contemplated by the protection scope of the present disclosure.

What is claimed is:

1. A method for information security management, the method comprising:
    storing contacts in a private information database of a terminal;
    obtaining first key information, while a dial panel interface or a short message interface is displayed on the terminal, when a triggering operation of the first key is detected;
    receiving information sent by an external device to the terminal, the received information including at least one of mail information, short message information, and call information;
    parsing the received information to obtain sender information of a sender of the external device, the received information;
    comparing the sender information with contacts stored in the private information database;
    when one of the contacts stored in the private information database matches the sender information, determining the received information as private information, which is to be stored into the private information database that is protected by an access password;
    storing independently the received information into the private information database separate from a non-private database of the terminal when the received information is determined as the private information;
    when none of the contacts stored in the private information database matches the sender information, determining the received information as non-private information;
    storing the received information into the non-private database when the received information is determined as the non-private information;
    determining whether the obtained first key information matches preset key information, wherein the preset key information includes the access password for the private information database and second key information, the second key information including one or more symbols; and
    upon determination that the obtained first key information matches the preset key information, displaying the private information stored in the private information database, which corresponds to the preset key information, via the dial panel interface or the short message interface of the terminal without a popup or a switching of an interface of the terminal, wherein a user of the terminal views the private information via the dial panel interface or the short message interface without the popup or the switching,
    wherein (i) a number of updated private short messages included in the private information is outputted when the one or more symbols included in the second key information corresponds to a first character, (ii) a number of updated private mails included in the private information is outputted when the one or more symbols included in the second key information corresponds to a second character, and (iii) all the private information received within a time period is outputted when the one or more symbols included in the second key information corresponds to a third character representing the time period.

2. The method according to claim 1, wherein, the obtaining first key information corresponding to the triggering operation of the first key comprises:
    identifying a key operation within a preset time period before the triggering operation of the first key, and obtaining the first key information corresponding to the identified key operation.

3. The method according to claim 1, wherein, the first key is a dial key.

4. A terminal for information security management, the terminal comprising:
    circuitry configured to:
    store contacts in a private information database of the terminal;
    obtain first key information, while a dial panel interface or a short message interface is displayed on the terminal, when a triggering operation of the first key is detected;
    receive information sent by an external device to the terminal, the received information including at least one of mail information, short message information, and call information;
    parse the received information to obtain sender information of a sender of the external device, the received information;
    compare the sender information with contacts stored in the private information database;
    when one of the contacts stored in the private information database matches the sender information, determine the received information as private information, which is to be stored into the private information database that is protected by an access password;
    store independently the received information into the private information database separate from a non-private database of the terminal when the received information is determined as the private information;
    when none of the contacts stored in the private information database matches the sender information, determine the received information as non-private information;
    store the received information into the non-private database when the received information is determined as the non-private information;
    determine whether the obtained first key information matches preset key information, wherein the preset key information includes the access password for the private information database and second key information, the second key information including one or more symbols; and
    upon determination that the obtained first key information matches the preset key information, display the private information stored in the private information database, which corresponds to the preset key information, via the dial panel interface or the short message interface of the terminal without a popup or a switching of an interface of the terminal, wherein a user of the terminal views the private information via the dial panel interface or the short message interface without the popup or the switching, wherein (i) a number of updated private short messages included in the private information is outputted when the one or more symbols included in the second key information corresponds to a first character, (ii) a number of updated private mails included in the private information is outputted when the one or more symbols included in the second key information corresponds to a second character, and (iii) all the private information received within a time period is outputted when the one or more symbols included in the second key information corresponds to a third character representing the time period.

5. The terminal according to claim 4, wherein, the circuitry is further configured to identify a key operation within a preset time period before the triggering operation of the first key, and obtain the first key information corresponding to the identified key operation.

6. The terminal according to claim 4, wherein the first key is a dial key.

7. A non-transitory storage medium containing computer-executable instructions, which, when executed by a computer, perform a method for information security management, the method comprising:

storing contacts in a private information database of the computer;

obtaining first key information, while a dial panel interface or a short message interface is displayed on the terminal, when a triggering operation of the first key is detected;

receiving information sent by an external device to the computer, the received information including at least one of mail information, short message information, and call information;

parsing the received information to obtain sender information of a sender of the external device, the received information;

comparing the received information with contacts stored in the private information database;

when one of the contacts stored in the private information database matches the sender information, determining the received information as private information, which is to be stored into the private information database that is protected by an access password;

storing independently the received information the private information database separate from a non-private database of the computer when the received information is determined as the private information;

when none of the contacts stored in the private information database matches the sender information, determining the received information as non-private information;

storing the received information into the non-private database when the received information is determined as the non-private information;

determining whether the obtained first key information matches preset key information, wherein the preset key information includes the access password for the private information database and second key information, the second key information including one or more symbols;

upon determination that the obtained first key information matches the preset key information, displaying the private information stored in the private information database, which corresponds to the preset key information, via the dial panel interface or the short message interface of the terminal without a popup or a switching of an interface of the terminal, wherein a user of the terminal views the private information via the dial panel interface or the short message interface without the popup or the switching, wherein (i) a number of updated private short messages included in the private information is outputted when the one or more symbols included in the second key information corresponds to a first character, (ii) a number of updated private mails included in the private information is outputted when the one or more symbols included in the second key information corresponds to a second character, and (iii) all the private information received within a time period is outputted when the one or more symbols included in the second key information corresponds to a third character representing the time period.

* * * * *